US010163238B2

(12) United States Patent
Isömaki

(10) Patent No.: US 10,163,238 B2
(45) Date of Patent: Dec. 25, 2018

(54) PROCESSING GRAPHICS PRIMITIVES IN A TILE-BASED GRAPHICS PROCESSING SYSTEM

(71) Applicant: ARM Limited, Cambridge (GB)

(72) Inventor: Marko Johannes Isömaki, Trondheim (NO)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 14/944,464

(22) Filed: Nov. 18, 2015

(65) Prior Publication Data

US 2016/0148337 A1    May 26, 2016

(30) Foreign Application Priority Data

Nov. 21, 2014    (GB) .................................. 1420737.7

(51) Int. Cl.
*G06T 1/20* (2006.01)
*G06T 1/60* (2006.01)
*G06T 11/40* (2006.01)

(52) U.S. Cl.
CPC .................................. *G06T 11/40* (2013.01)

(58) Field of Classification Search
CPC .................................. G06T 1/60; G06T 1/20
USPC ......................................................... 345/557
See application file for complete search history.

(56) References Cited

U.S. PATENT DOCUMENTS 6,690,380 B1 * 2/2004 Hussain .............. G06F 12/0875
345/557
6,801,203 B1 * 10/2004 Hussain .................... G06T 1/20
345/502
7,382,377 B1    6/2008 Everitt
8,698,828 B2    4/2014 Plowman
2002/0118202 A1 * 8/2002 Baldwin ................... G06T 1/20
345/530

(Continued)

FOREIGN PATENT DOCUMENTS

CN    101178806    5/2008
GB    2460545    12/2009

(Continued)

OTHER PUBLICATIONS

Great Britain Search Report dated Feb. 9, 2009, GB Patent Application No. GB0810205.5.

(Continued)

*Primary Examiner* — Phong Nguyen
(74) *Attorney, Agent, or Firm* — Vierra Magen Marcus LLP

(57) ABSTRACT

A graphics processing core of a tile-based graphics processing system when processing a tile of a graphics output reads a primitive to be processed off a tile list for the tile being processed, along with an identifier for that primitive. The graphics processing core then checks whether or not the identifier matches the identifier stored for any entry stored in a primitive data cache. A match indicates that primitive-specific data (including line equations, depth equations and barycentric equations) for the primitive to be processed is stored in the cache. If a match is found then the stored primitive-specific data is retrieved and used to process (rasterise and render) the primitive. If no match is found, primitive-specific data is calculated from scratch, stored in the primitive data cache, and used to process the primitive.

18 Claims, 4 Drawing Sheets

(56) References Cited

U.S. PATENT DOCUMENTS

| | | | |
|---|---|---|---|
| 2005/0219253 A1* | 10/2005 | Piazza | G06T 15/005 345/557 |
| 2007/0146378 A1* | 6/2007 | Sorgard | G06T 15/00 345/581 |
| 2008/0114942 A1 | 5/2008 | Brown | |
| 2009/0066714 A1 | 3/2009 | Liao | |
| 2009/0073177 A1* | 3/2009 | Jiao | G06T 1/60 345/501 |
| 2009/0147016 A1* | 6/2009 | Barone | G06T 15/005 345/581 |
| 2010/0026682 A1* | 2/2010 | Plowman | G06T 15/40 345/419 |
| 2011/0216068 A1* | 9/2011 | Sathe | G06T 17/20 345/441 |
| 2012/0206455 A1* | 8/2012 | Shreiner | G06T 15/005 345/420 |
| 2012/0304194 A1* | 11/2012 | Engh-Halstevdt | G06F 9/4881 718/106 |
| 2013/0073884 A1* | 3/2013 | Ulmer | G06F 1/3203 713/320 |
| 2013/0162651 A1* | 6/2013 | Martin | G06T 17/20 345/441 |
| 2014/0071150 A1* | 3/2014 | Fishwick | G06T 15/005 345/589 |
| 2014/0118364 A1* | 5/2014 | Hakura | G06T 11/40 345/505 |
| 2014/0204080 A1* | 7/2014 | Goel | G06T 1/20 345/419 |
| 2014/0267238 A1* | 9/2014 | Lum | G06T 3/403 345/419 |
| 2014/0375647 A1* | 12/2014 | Salvi | G06T 15/40 345/428 |
| 2015/0062127 A1* | 3/2015 | Kwon | G06T 15/005 345/441 |
| 2015/0097830 A1* | 4/2015 | Jeong | G06T 15/005 345/421 |
| 2015/0187123 A1* | 7/2015 | Hwang | G06T 15/005 345/421 |
| 2015/0348317 A1* | 12/2015 | Hakura | G06T 15/87 345/426 |
| 2016/0027144 A1* | 1/2016 | Fernandez | G06T 1/60 345/522 |
| 2016/0035128 A1* | 2/2016 | Zhao | G06T 1/20 345/522 |
| 2016/0125649 A1* | 5/2016 | Jeong | G06T 15/405 345/422 |
| 2016/0148339 A1* | 5/2016 | Akenine-Moller | G06T 1/60 345/531 |

FOREIGN PATENT DOCUMENTS

| | | |
|---|---|---|
| JP | 2003-016438 | 1/2003 |
| JP | 2007-233730 | 9/2007 |
| JP | 2008-123497 | 5/2008 |

OTHER PUBLICATIONS

Chinese Office Action dated Jul. 26, 2012, Chinese Patent Application 200910163931.2.

Chinese Office Action dated Mar. 20, 2013, Chinese Patent Application No. 200910163931.2.

Japanese Notice of Reasons for Rejection dated Aug. 20, 2013, Japanese Patent Application No. 2009-134193.

Chinese Decision of Rejection dated Sep. 13, 2013, Chinese Patent Application No. 200910163931.2.

GB Search Report dated May 14, 2015, GB Patent Application No. 1420737.7.

Michael Cox and Narendra Bhandari, "Architectural Implications of Hardware-Accelerated Bucket Rendering on the PC," Proceedings of the 1997 Siggraph/Eurographics Workshop on Graphics Hardware, Los Angeles, CA, Aug. 3-4, 1997, pp. 25-34.

Iosif Antochi, Ben Juurlink, Stamatis Vassiliadis and Petri Liuha, "Memory Bandwidth Requirements of Tile-Based Rendering", Computer Systems: Architectures, Modeling, and Simulation, vol. 3133 of the series Lecture Notes in Computer Science, 2004, pp. 323-332.

* cited by examiner

PROCESSING GRAPHICS PRIMITIVES IN A TILE-BASED GRAPHICS PROCESSING SYSTEM

BACKGROUND

The technology described herein relates to a method and apparatus for processing graphics, and in particular to a method and apparatus for use when processing graphics primitives in a tile-based graphics processing system.

As is known in the art, graphics processing is normally carried out by dividing the graphics processing output to be generated into a number of similar basic components or "primitives", which are then subjected to the desired graphics processing operations. The graphics "primitives" are usually in the form of simple polygons, such as triangles.

The primitives for an output such as a frame to be displayed are usually generated by the applications program interface for the graphics processing system, using the graphics drawing instructions (requests) received from the application (e.g. game) that requires the graphics processing.

Each primitive is at this stage usually defined by and represented as a set of vertices. Each vertex for a primitive has associated with it a set of data (such as position, colour, normal, texture coordinate and other attributes data) representing the vertex. (This data is then used, e.g., when rasterising and rendering the primitive to which the vertex relates, e.g. for display.)

Once primitives (and their vertices) have been generated and defined, they can be processed by the graphics processing system, in order, e.g. to render the desired graphic processing output, such as a frame for display.

It is known in graphics processing systems to use so-called "tile-based" rendering. In tile based rendering, the, e.g., two dimensional, output array or frame of the rendering process (the "render target") (e.g., and typically, that will be displayed to display a scene that is being rendered) is sub-divided or partitioned into a plurality of smaller sub-regions, usually referred to as "tiles", for the rendering process. The tiles (sub-regions) are each rendered separately (typically one after another). The rendered tiles (sub-regions) are then recombined to provide the complete output array (frame) (render target), e.g. for display.

The tiles can therefore be thought of as the sub divisions of the render target area (output frame) that the rendering process operates on. In such arrangements, the render target area (output frame) is typically divided into regularly sized and shaped tiles (they are usually, e.g., squares or rectangles) but this is not essential.

Other terms that are commonly used for "tiling" and "tile-based" rendering include "chunking" (the sub-regions are referred to as "chunks") and "bucket" rendering. The terms "tile" and "tiling" will be used herein for convenience, but it should be understood that these terms are intended to encompass all alternative and equivalent terms and techniques.

It is now known to provide tile-based graphics processing systems that include multiple independent graphics processors/processing cores. This offers the opportunity to render plural tiles in parallel, thereby potentially reducing the time taken to render an output frame. Typically, in these systems, any one processor will render more than one tile of any particular output frame.

In tile-based rendering, before any given tile of an output frame is rendered, it is typically first determined which tiles of the output frame each and every primitive that is to be processed (potentially) falls within (at least partially). Typically this determination is made using the positions of the vertices of each primitive. Depending on its size, a primitive may fall within just one tile of an output array, or, alternatively, a primitive may fall within multiple tiles of an output array.

As part of this process, a list is produced for each and every tile (and/or for sets of plural tiles) of the render output, e.g. frame, in question, indicating which primitives should be processed for the tile(s) to which the list relates. Each such list typically contains data (e.g. vertex data, as discussed above), commands, etc., for each primitive appearing in the tile(s) to which the list corresponds. The tile list is then read by the graphics processor allocated to the corresponding tile when that tile is to be processed. As noted above, the same primitive may fall within multiple tiles, and so the data for the same primitive may appear in multiple tile lists (corresponding to multiple tiles).

When processing a particular primitive in a tile list, the graphics processor will typically calculate primitive-specific data for the primitive before that primitive processed (rasterised and rendered). This primitive-specific data will typically include (line) equations representing each of the edges of the primitive, which are derived (e.g. using the primitive vertex data) in order to test which sampling points within a tile are covered by that particular primitive during the rasterisation process. This primitive-specific data may also include, for example, depth equations, barycentric interpolation equations, etc.

BRIEF DESCRIPTION OF THE DRAWINGS

Embodiments of the technology described herein will now be described by way of example only and with reference to the accompanying drawings, in which.

DETAILED DESCRIPTION

Figure 1:
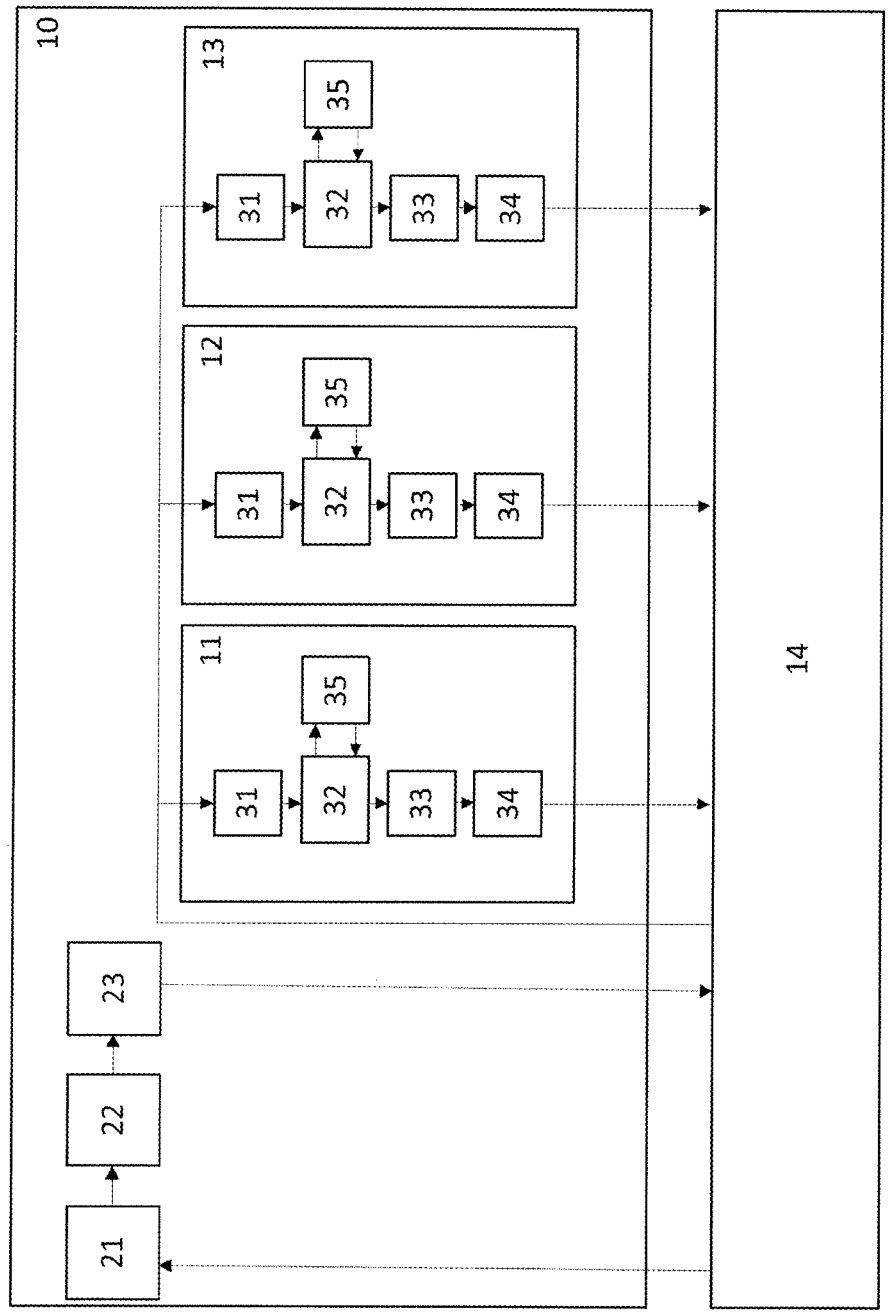
FIG. 1 shows schematically a graphics processing system that can operate in accordance with the technology described herein.

A first embodiment of the technology described herein comprises a method of operating a graphics processing core of a tile-based graphics processing system when processing a tile of a graphics output to be generated, the method comprising:

identifying a primitive to be processed for the tile being processed;

determining whether already-calculated primitive-specific data for the primitive is stored in a memory; and if it is determined that already-calculated primitive-specific data for the primitive is stored in the memory, retrieving stored primitive-specific data for the primitive and using that stored data to process the primitive;

if it is determined that already-calculated primitive-specific data for the primitive is not stored in the memory, calculating primitive-specific data for the primitive, using that calculated data to process the primitive, and storing at least some of the calculated primitive-specific data for the primitive for use after the primitive has been processed.

A second embodiment of the technology described herein comprises a tile-based graphics processing system comprising a graphics processing core for processing a tile of a graphics output to be generated, wherein the graphic processing core is capable of:

identifying a primitive to be processed for the tile being processed;

determining whether already-calculated primitive-specific data for the primitive is stored in a memory; and in response to a determination that already-calculated primitive-specific data for the primitive is stored in the memory, retrieving stored primitive-specific data for the primitive and using that stored data to process the primitive;

in response to a determination that already-calculated primitive-specific data for the primitive is not stored in the memory, calculating primitive-specific data for the primitive, using that calculated data to process the primitive, and storing at least some of the calculated primitive-specific data for the primitive for use after the primitive has been processed.

The technology described herein relates to tile-based graphics processing systems. A primitive that is to be processed for a tile is identified, but prior to the primitive being processed it is first checked whether or not primitive-specific data for that primitive is already available in memory. If it is, the already-calculated primitive-specific data is retrieved from memory for use when the primitive is processed. On the other hand, if previously calculated and stored primitive-specific data for the primitive is not available, then primitive-specific data for the primitive is calculated, the newly-calculated primitive-specific data is then used when processing the primitive, and that newly-calculated primitive-specific data is also stored so that it may potentially be used after the primitive has been processed (e.g. when the same primitive is to be processed for a different tile).

In other words, instead of always calculating primitive-specific from scratch whenever a primitive is to be processed (as occurs in prior art systems), calculated primitive-specific data for a primitive is stored for potential reuse should that primitive fall to be processed again.

The Applicants have recognised in this regard that in tile-based graphics processing systems, a given primitive may fall within, and therefore need to be processed for, plural tiles. In conventional systems, the primitive specific data for the primitive would be calculated afresh for each tile that the primitive is to be processed for.

The technology described herein addresses this by storing primitive-specific data for a particular primitive when the primitive is processed for a tile, and then retrieving this stored primitive-specific data (if it is available) when the same primitive falls to be processed subsequently, e.g., and in an embodiment, for another tile that the primitive falls within. This facilitates avoiding having to repeat the same primitive-specific data calculations each time the same primitive falls to be processed again (e.g. when processing different tiles).

Thus, compared to prior art systems, the technology described herein can result in a significant overall reduction in the total number of primitive specific data calculations that will need to be carried out when processing a particular primitive multiple times, thereby, e.g., reducing power consumption. As will be understood from the above, the greater the number of times that the same primitive falls to be processed, the greater the (potential) saving in energy brought about by the storing and reusing of primitive-specific data for that primitive in accordance with the technology described herein.

The technology described herein relates to tile-based graphics processing. It is, in an embodiment, applied to plural tiles of (and in an embodiment to each tile of) a given graphics output, e.g. frame, being processed.

The tiles of the graphics output (e.g. frame) can be any suitable size or shape. In an embodiment the tiles are all the same size and shape, as is known in the art, although this is not essential. In an embodiment, each tile is rectangular (including square), and in an embodiment each tile is 16×16, 32×32 or 16×8 sampling positions in size.

The graphics processing core of the technology described herein may comprise any suitable and desired graphics processing core which may be used to process a tile of a graphics output to be generated in a tile-based graphics processing system. The graphics processing core may be the sole graphics processing core of a single processor tile-based graphics processing system, or it may be (and in one embodiment is) a graphics processing core of a multi-core tile-based graphics processing system (i.e. that has multiple independent graphics processing cores that may process tiles in parallel).

Thus, in an embodiment, the technology described herein is implemented in a multi-core graphics processing system. In such an arrangement, each processing core can, and in an embodiment does, operate in the manner of the technology described herein.

The identification of a primitive to be processed can be carried out in any suitable or desired manner. In an embodiment, a primitive to be processed is identified by reading a "tile list" that has been created (by, e.g. a tiling unit) for the tile being processed. When reading the tile list, the processing core may read data (e.g. vertex data), commands, etc., for the primitive. The tile list may be for a single tile or for a set of plural tiles.

The primitive-specific data may comprise any suitable data that is particular to the primitive to which the primitive-specific data corresponds. For example, the primitive-specific data may, and in an embodiment does, comprise data that is required in order for the graphics processing core to process (e.g. to rasterise and/or render) the primitive to which the primitive-specific data corresponds. In an embodiment, the primitive-specific data comprises primitive setup data, although it could also or instead be other per-primitive data, if desired. It can comprise both equations and data values for a primitive.

In an embodiment, the primitive specific data comprises equations representing the geometry of the primitive to which the primitive corresponds. These equations in an embodiment include one or more of: (line) equations representing one or more of, and in an embodiment each of, the edges of the primitive (which are derived, e.g. in order to test which sampling points within a tile are covered by that particular primitive during the rasterisation process); depth equations; barycentric interpolation equations and plane equations. The primitive-specific data may also (or alternatively) include a data value or values (e.g. face, winding, coordinates, min/max depth values, etc.) for the primitive, the area of the primitive, or any other type of data that may be necessary for the primitive to be processed (e.g., and in an embodiment, rasterised and rendered).

The memory where the primitive specific data is stored and looked for may comprise any suitable and desired memory that is able to be accessed by the graphics processing core. For example, it may be a dedicated memory for the purpose of storing calculated primitive specific data, or it may be part of a memory that is used to store other data in addition to primitive-specific data. The memory may be any suitable and desired information storage, such as, e.g., a register or registers, a buffer or buffers, a cache or caches, etc. In an embodiment, it comprises a buffer, and in an embodiment it comprises a local, cache memory, of or accessible to the graphics processing core.

Where the technology described herein is being implemented in a multi-core graphics processing system, then each processing core may have its own separate memory (e.g. cache) for this purpose (which is thus in an embodiment accessible only by the graphics processing core in question (and not by, e.g., the other graphics processing cores (which may instead have their own primitive specific data caches)).

Alternatively, a plurality of graphics processing cores could share the same primitive specific data memory (there could, e.g., be a cache that is able to be accessed by more than one graphics processing core). In this case, the memory or each memory (e.g. cache) may be shared by (and able to be accessed by) any number of graphics processing cores, although in an embodiment the memory is shared between two or four cores.

The memory or memories (e.g. cache or caches) may be any suitable and desired size, but will in an embodiment be large enough to store primitive-specific data for plural primitives. In an embodiment, the (and each) memory is capable of storing primitive-specific data for 16 to 64, in an embodiment 35 to 45 primitives. Other sizes of memory are, of course, possible. In an embodiment the number of primitive data entries that can be stored in the memory can be configured in use, e.g., and in an embodiment, based on the graphics content being processed.

After identifying the primitive to be processed, the graphics processing core determines whether or not already-calculated primitive-specific data for that primitive is stored in memory. The determination of whether or not already-calculated primitive-specific data for a primitive to be processed is stored in the memory can be carried out as desired and in any suitable manner. In an embodiment, this determination is made by checking whether or not a particular identifier (e.g. an identification number) for the primitive that is to be processed is the same as an identifier that is associated with any already-calculated primitive-specific data that is stored in the memory. If the identifier of the primitive to be processed matches an identifier for primitive specific data stored in the memory, then that will indicate that already-calculated primitive-specific data for the primitive is stored in the memory. Other methods are, of course, possible.

To facilitate this operation, in an embodiment, the primitive specific data is stored in the memory in association with an identifier for the primitive that it relates to.

Correspondingly, the primitives to be processed are in an embodiment each associated with a respective identifier, and, e.g., and in an embodiment, the tile lists include the identifiers of the primitives that they list.

Thus, in an embodiment, when the graphics processing core identifies a primitive to be processed, by, e.g., reading that primitive off a tile list (for the tile that is being processed), the graphics processing core also reads an identifier which has been assigned to that primitive.

The identifiers that are assigned to the primitives for this purpose can take any suitable and desired form. They should, and in an embodiment do, at least identify the primitives uniquely within the set of primitives being processed (e.g. that are to be processed for the graphics output (e.g. frame) being generated).

The identifiers may be assigned specifically for the purposes of the technology described herein, or if there are suitable identifiers that are already allocated to primitives for other purposes, those identifiers can be used for the purposes of the technology described herein as well.

In an embodiment, the identifier that is assigned to a primitive (and that is used to determine whether or not already-calculated primitive-specific data is stored for a primitive that is to be processed) is an identifier which is a modified version of an identifier that is otherwise specified for use for identifying primitives in the graphics processing system in question.

The identifiers can be assigned to the primitives as desired and in any suitable manner and at any suitable stage of the primitive processing. In an embodiment, the identifiers are assigned to (and associated with) the primitives before the primitives are assigned to individual tiles (are placed in the tile lists) (i.e. in advance of the tiling operation). This may be done, e.g., at a primitive assembly stage of the graphics processing pipeline.

The Applicants have recognised in this regard that (some) application programming interfaces (APIs) already use an identification mechanism in order to track specific primitives at an earlier stage of the graphics processing pipeline, and, furthermore, that this identification mechanism can be modified to thereby provide suitably unique identifiers for each primitive of an output to be generated.

The already-calculated primitive specific data that is sought and retrieved from memory may include any primitive-specific data (as described above) which has been calculated for the primitive at an earlier time (e.g. when a different tile was being processed). The already-calculated primitive-specific data may have been (and in one embodiment has been) calculated previously by the same graphics processing core that is now to process the primitive. Alternatively, and especially for embodiments wherein the memory is a memory that is shared between (and accessible by) a plurality of processing cores, the already-calculated primitive-specific data may have been calculated by a graphics processing core other than the graphics processing core that is now to process the primitive.

If it is found that already-calculated primitive-specific data for the primitive that is to be processed is stored within the memory, then this already-calculated primitive-specific data is retrieved and used to process the primitive. In this case, the already-calculated primitive-specific data is in an embodiment sent to the fragment (sampling position) generating part of the graphics processing pipeline immediately.

Using the already-calculated primitive-specific data may comprise using the data in the form it was stored in (e.g. without any further modifications) when processing (e.g. rasterising and rendering) the primitive (and in one embodiment this is what is done).

Alternatively, and/or additionally, using the already-calculated primitive-specific data (to process the primitive) may include performing partial calculations on the (retrieved) already-calculated primitive-specific data, so that the data is modified from the form that it is stored in, and then using that "modified" data to process the primitive.

The Applicants have recognised in this regard that when primitive-specific data is calculated (for the purpose of processing a primitive), the calculations may be (and often are) dependent (at least in part) on the tile itself. In other words, primitive-specific data for the same primitive may be calculated differently for (and be different for) different tiles.

This is because the primitive-specific data for a particular primitive which is (most) appropriate to process the primitive (when processing a tile) may be also be dependent on the tile itself. As such, primitive-specific data calculated for the purpose of processing that primitive when processing one tile may not be wholly suitable for processing that primitive when processing another tile.

For example, in some cases equations for a primitive (or at least some parts of the equations to be used when processing a primitive) are calculated relative to the corner of the tile in question, and not, e.g., simply relative to the corner of the overall render output. In this case, such equations, although relating to the same primitive, would be different for each different tile that the primitive falls within.

In the technology described herein, as will be understood from the above, the stored already-calculated primitive-specific data for the primitive may have been calculated (and stored) when another tile was being processed. As such, if the retrieved primitive-specific data was calculated when processing another tile, then this already-calculated primitive-specific data may not be suitable (in the form that it's in when retrieved) for complete re-use when processing the primitive in the current tile.

Therefore in one embodiment, instead of using the already-calculated primitive-specific data in its "raw" form (i.e. in the form it is in when retrieved from the memory) to process the primitive, the process of using the already-calculated primitive-specific data comprises first modifying the already-calculated primitive-specific data that is stored in the memory, and then using the so-modified primitive specific data to process the primitive. The modification of the stored primitive specific data may include, for example, and in an embodiment, running partial calculations on the already-calculated primitive-specific data that has been retrieved from the memory, e.g. in order to convert the primitive-specific data into a form that is (more) appropriate for use when processing the current tile.

Thus in one embodiment, the stored already-calculated primitive-specific data is simply reused in its existing form to process the primitive. In another embodiment, the stored already-calculated primitive-specific data is first updated (modified) before using it to process the primitive. It would also be possible for the stored already-calculated primitive-specific data to be used both in its stored form to perform some processing of the primitive, and also to be modified or updated to a modified form for use to process the primitive.

Where the primitive is processed using stored already-calculated primitive-specific data (whether in its "raw" form and/or in a modified form), then the primitive could be processed using the stored already-calculated primitive-specific data alone, or further primitive-specific data could also be calculated and used to process the primitive, if required. Thus in an embodiment, if it is found that already-calculated primitive-specific data for the primitive that is to be processed is stored in the memory, then the primitive is processed using both that stored already-calculated primitive-specific data and further, newly calculated, primitive-specific data.

If it is found that already-calculated primitive-specific data for the primitive that is to be processed is not stored within the memory, then primitive-specific data is calculated for the primitive (from scratch) and used to process the primitive. This can be carried out as desired and in any suitable manner, such as in the existing manner for the graphics processing system in question.

After calculating the primitive-specific data, the graphics processing core stores at least some of this primitive-specific data in the memory for use after the primitive has been processed. This can be carried out as desired and in any suitable manner. As discussed above, in an embodiment, the primitive-specific data is stored in the memory in association with a particular identifier (e.g. an identification number) for the primitive to which the primitive-specific data corresponds.

The calculated primitive-specific data can be stored in the memory either before or after it is used for processing the primitive. In an embodiment, the primitive-specific data is calculated, and then stored in the memory, and then after that used for processing the primitive.

It will be appreciated in this regard that the intention here is that the calculated primitive-specific data is stored in the memory such that it can (potentially) be available for use should the same primitive fall to be processed again, e.g. in a different tile, and thus the arrangement for storing the calculated primitive-specific data for the primitive should not be (and is in an embodiment not) simply such that that data is transiently available while the instance of the primitive for which it has actually been calculated is being processed, but instead should be such that the calculated primitive-specific data can be available in the memory should the primitive fall to be processed again. Thus, in an embodiment, the calculated primitive-specific data is stored in the memory such that it will be available for use after the tile currently being processed has been processed (and such that it will be available for use when processing another, different tile of the graphics processing output).

This does not preclude, in embodiments wherein the memory is a memory that is shared between (and accessible by) a plurality of graphics processing cores, a graphics processing core from retrieving primitive-specific data for a particular primitive whilst that same primitive is (still) being processed (using, e.g., that same primitive-specific data) by another graphics processing core (e.g. when that another graphics processing core is processing another tile that the same primitive falls within). In other words, it could, and in an embodiment would, be possible for the same primitive-specific data to be used simultaneously by plural graphics processing cores, in order to process the same primitive within different tiles concurrently.

In one embodiment, as discussed above, the memory will only be large enough to store primitive-specific data for a limited number of primitives.

To allow for this, the storing of the primitive-specific data is in an embodiment arranged so as to facilitate that data being available when it is needed, but also to allow stored primitive-specific data to be replaced with recently calculated primitive-specific data where required.

This can be achieved as desired, but in an embodiment, the following arrangement is used. Firstly, when primitive-specific data is first calculated for a primitive that is to be processed, that primitive-specific data is stored in the memory and marked as "in use", such that that data cannot then be overwritten. Once that calculated data has been used to process the current instance of the primitive in question (i.e. the instance of the primitive that has triggered the calculation of the data), then the memory entry that stores that primitive-specific data is in an embodiment indicated as being "free but valid", i.e. indicating that the data contains valid data for the primitive in question, but is not currently in use to process that primitive and so can therefore, if required, be overwritten.

This will then allow the system to keep track of which sets of stored primitive-specific data are currently in use (and so must not be overwritten), and which sets are currently available for reuse (i.e. contain valid data), but are not actually currently being used and so can be overwritten if required. In an embodiment it can also be indicated if there are any "empty" memory entries that can be used for primitive-specific data. These indications can be provided as desired, e.g. by including appropriate flags or tags in association with the (data entries in the) memory.

Thus, in an embodiment, if the memory is full when the graphics processing core calculates primitive-specific data for a primitive to be processed, then the graphics processing core will in an embodiment store the newly calculated primitive-specific data in the memory by overwriting another entry containing primitive-specific data for another primitive (and, e.g., its identifier). The entry that is chosen to be overwritten may be decided upon a particular (and desired) overwrite/replacement algorithm. In an embodiment, a "least recently used" algorithm is used to determine the primitive-specific data that is overwritten, but other arrangements would, of course, be possible.

The processing of the primitive that uses the primitive-specific data can be any desired and suitable form of processing that a primitive can undergo and that requires primitive-specific data. This will, for example, depend upon the nature of the primitive-specific data in question.

For example, this processing could include using line (edge) equations to test which sampling points of the tile are covered by the particular primitive as part of a rasterisation operation. Other types of primitive-specific data such as, e.g. depth equations, barycentric interpolation equations, etc., could be used when rendering (shading) the primitive.

In an embodiment, the processing comprises at least one of, and in an embodiment both of, rasterising and rendering (shading) the primitive.

As well as processing the primitive using the primitive-specific data, the processing of the primitive may also use other data, and/or include other processing operations that do not use the primitive-specific data, as required.

Once the primitive has been processed, the processed primitive data (e.g. sampling position values) can be written, e.g., to a tile buffer, as desired, with the data in the tile buffer then being written out, e.g., to a frame buffer in main memory once all the primitives for the tile have been processed.

Although the technology described herein has been described above with particular reference to the processing of a given primitive for a given tile of a graphics output to be generated, as will be appreciated by those skilled in the art, the technology described herein can be and is in an embodiment repeated for plural primitives (and in an embodiment for each primitive) that fall to be processed for a tile, and correspondingly, for plural tiles, and in an embodiment for each tile, of a given graphics output that is being generated. Correspondingly, the process may be repeated for successive graphics outputs to be generated, for example for a sequence of frames to be displayed.

The technology described herein can be used for all forms of output that a graphics processing system may be used to generate, such as frames for display, render to texture outputs, etc. The final output of the graphics processing can, e.g., be written, e.g. to a frame buffer, in main memory, from where it can then, e.g., be comprised to a display for display, or otherwise processed.

The technology described herein can be implemented in any desired and suitable (tile-based) graphics processing system.

The above describes the elements of the graphics processing pipeline that are involved in the operation in the manner of the technology described herein. As will be appreciated by those skilled in the art, the graphics processing system can otherwise include, and in an embodiment does include, any one or one or more, and in an embodiment all, of the other processing stages that graphics processing systems normally include. Thus, for example, the graphics processing system in an embodiment includes at least a rasteriser operable to rasterise the assembled one or more output primitives to generate graphics fragments to be processed, and a renderer operable to process fragments generated by the rasteriser to generate rendered fragment data. In an embodiment the renderer is in the form of or includes a programmable fragment shader.

The graphics processing system in an embodiment also includes one or more of, and in an embodiment all of: a vertex shading stage; a primitive assembly stage; a tiler (tiling stage); a primitive setup stage; a tile buffer or buffers for storing tile sample values and/or a write out unit that operates to write the data in the tile buffer (e.g. once the data in the tile buffer is complete) out to external (main) memory (e.g. to a frame buffer).

The graphics processing system may also contain any other suitable and desired processing stages that a graphics processing system may contain such as a depth (or depth and stencil) tester or testers, a blender, etc.

In an embodiment, the graphics processing pipeline comprises, and/or is in communication with, one or more memories and/or memory devices that store the data described herein, and/or that store software for performing the processes described herein. The graphics processing pipeline may also be in communication with the host microprocessor, and/or with a display for displaying images based on the output of the graphics processing pipeline.

In an embodiment, the graphics processing system is implemented as a graphics processing unit that includes a vertex shading stage, a primitive assembly stage, a tiling stage, and one or more graphics processing cores, with each such core including, inter alia, a rasteriser and a renderer and a respective local memory, e.g. buffer or buffers, for example that can store tile data for a tile being processed by the graphics processing core and primitive-specific data in the manner of the technology described herein.

Other arrangements would, of course, be possible.

In an embodiment, the various functions of the technology described herein are carried out on a single graphics processing platform that generates and outputs the rendered fragment data that is, e.g., written to a frame buffer for a display device.

The technology described herein can be implemented in any suitable system, such as a suitably configured microprocessor based system. In some embodiments, the technology described herein is implemented in computer and/or micro-processor based system.

The various functions of the technology described herein can be carried out in any desired and suitable manner. For example, the functions of the technology described herein can be implemented in hardware or software, as desired. Thus, for example, the various functional elements and "means" of the technology described herein may comprise a suitable processor or processors, controller or controllers, functional units, circuitry, processing logic, microprocessor arrangements, etc., that are operable to perform the various functions, etc., such as appropriately dedicated hardware elements (processing circuitry) and/or programmable hardware elements (processing circuitry) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry, etc., if desired.

It will also be appreciated by those skilled in the art that all of the described embodiments of the technology described herein can include, as appropriate, any one or all of the optional features described herein.

The methods in accordance with the technology described herein may be implemented at least partially using software e.g. computer programs. It will thus be seen that when viewed from further embodiments the technology described herein comprises computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processing system may be a microprocessor, a programmable FPGA (Field Programmable Gate Array), etc.

The technology described herein also extends to a computer software carrier comprising such software which when used to operate a graphics processor, renderer or other system comprising a data processor causes in conjunction with said data processor said graphics processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein comprises computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions fixed on a tangible, non-transitory medium, such as a computer readable medium, for example, diskette, CD ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, preloaded with a computer system, for example, on a system ROM or fixed disk, or distributed from a server or electronic bulletin board over a network, for example, the Internet or World Wide Web.

FIG. 1 shows schematically a graphics processing unit (GPU) (graphics processor) 10 that may be operated in accordance with the technology described herein.

The graphics processing unit 10 includes plural graphics processing cores 11, 12 and 13, and can access a main memory 14. The main memory 14 may be, as is known in the art, "on-chip" with the graphics processing unit 10 or may be an external memory that can be accessed by the graphics processing unit 10. The main memory 14 may include a frame buffer (not shown).

FIG. 1 shows a graphics processing unit 10 with three graphics processing cores, but other configurations of graphics processing cores can be used if desired.

The main memory 14 stores, inter alia, geometry data (which is, for example, provided by the graphics processing driver or an API running on a host system (microprocessor) of the graphics processing unit) and a set of tile (primitive) lists.

The tile lists each represent a respective tile that the graphics output (e.g. frame) to be generated by the graphics processor 10 is divided into for processing (rasterising and rendering) purposes, and contain data, commands, etc., for the respective primitives that are to be processed for the respective tile that the list corresponds to. In the present embodiment, each tile list will also store an ID number for each of the respective primitives that are to be processed for the tile to which the tile list corresponds (as will be discussed below).

(As discussed above, the technology described herein is applicable to graphics processing systems in which the graphics output (e.g. frame) is processed as plural individual tiles. Thus each graphics processing core 11, 12, 13 operates on one respective tile of the graphics output at any given time, and once it has completed the processing of its current tile it will move on to processing another tile of the graphics output, and so on.)

The graphics processing unit 10 includes a programmable vertex shading stage 21, a primitive assembly stage 22 and a tiler 23. The method by which the graphics processing unit 10 implements a tiling flow process according to the present embodiment is described below in relation to FIG. 3.

Each of the graphics processing cores 11, 12 and 13 includes a tile list reader 31, a primitive data cache 32, a rasterizer 33, renderer (shader) 34 and a primitive setup unit 35. Each graphics processing core also includes a tile buffer or tile buffers (not shown). The primitive setup unit 35 calculates primitive-specific data for a primitive from that primitive's vertex data. The rasteriser 33 of a respective graphics core will then take as its input primitive-specific data for the primitive, rasterise the primitive to graphics fragments, and provide these fragments to the shading unit. The shading unit will then perform shading operations on the fragments, and generate shaded fragment data which it stores in a tile buffer or buffers of the respective graphics processing core for providing to a graphics output target, which in this embodiment is a frame buffer in the main memory (not shown). The method by which each of the graphics processing cores operates according to the present embodiment is described below in relation to FIG. 4.

In the present embodiment, the primitive data cache 32 of a respective graphics processing core is used to store a number of entries for individual primitives, each entry containing primitive-specific data for the primitive alongside a unique ID number for the primitive (as discussed below). In the present embodiment, each primitive data cache stores entries for up to 42 primitives. Other configurations are of course possible, however.

FIG. 1 shows graphics processing cores 11, 12, 13 each with their own individual primitive data caches 32. However, other configurations where any number of primitive data caches are shared between (and are accessible by) any number of graphics processing cores, are also possible.

In the present embodiment, the primitive-specific data comprises data that is required in order for a graphics processing core to process (rasterise and render) the primitive to which the primitive-specific data corresponds. This includes line equations representing each of the edges of the primitive (which are derived in order to test which sampling points within a tile are covered by that particular primitive during the rasterisation process), depth equations, and barycentric interpolation equations for the primitive and the area of the primitive.

Figure 2:
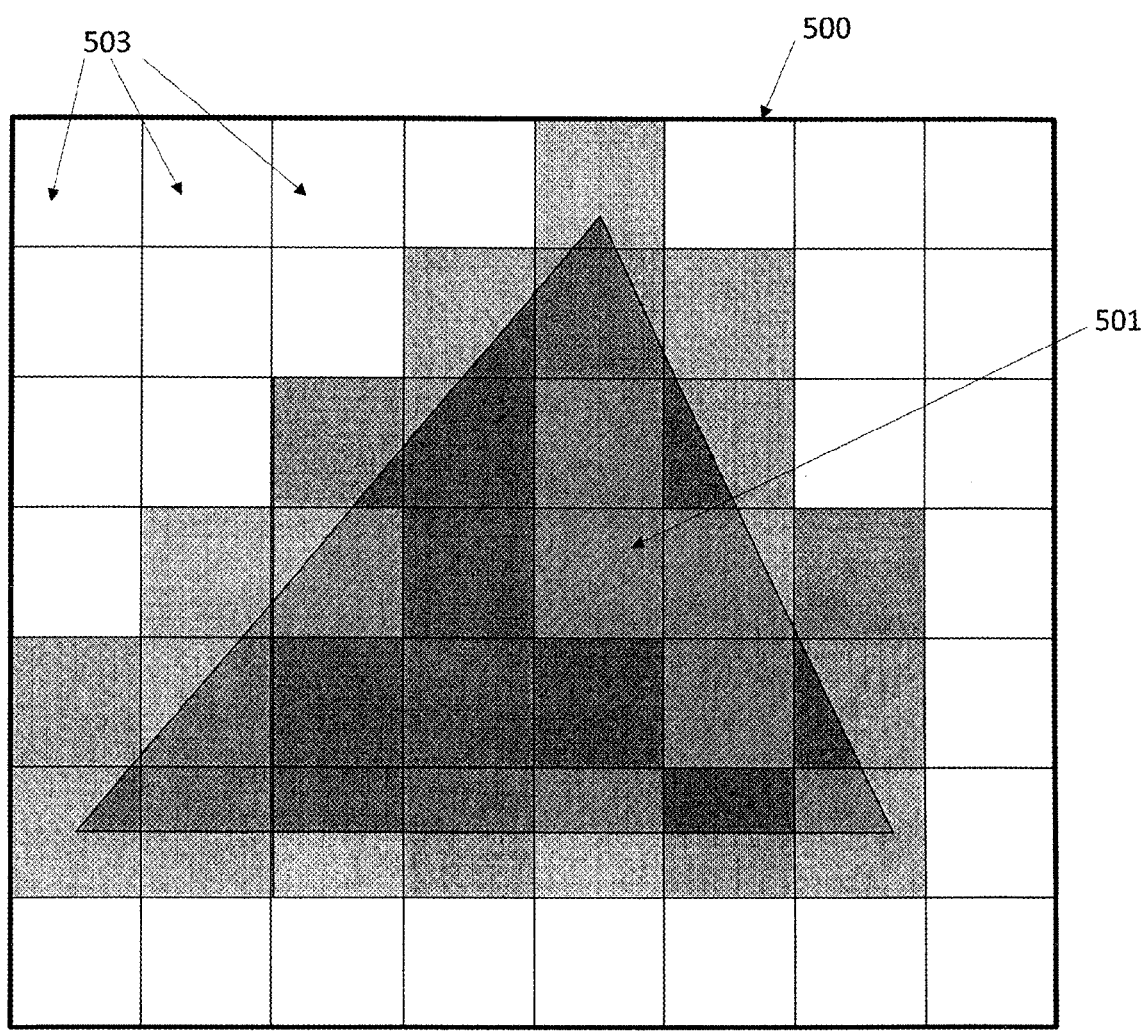
FIG. 2 shows a graphics output containing a primitive which falls within multiple tiles.

FIG. 2 shows a graphics output 500 divided into tiles 503 (visualised as the smaller rectangles) which may be generated by the graphics processing unit 10. Primitive 501 is an example of a primitive which falls within multiple tiles 503 of the output 500. As discussed above, in a tile-based graphics processing system, tiles are processed individually in order to generate the graphics output 500. Therefore the primitive 501 will have to be processed for each individual tile 503 that the primitive 501 falls within. In the present embodiment, tiles 503 are individually processed by graphics processing cores 11, 12 and 13.

In order for primitive 501 to be processed, however, primitive-specific data for the primitive is required. In conventional systems, this primitive-specific data is calculated afresh for each tile that the primitive 501 is to be processed for. In the present embodiment however, primitive-specific data for primitive 501 is stored in a primitive data buffer 32 when the primitive is processed, so that it may (potentially) be retrieved (and reused) when the primitive is processed for another tile, according to the methods discussed below. This facilitates avoiding having to repeat the same calculations each time primitive 501 is to be processed (when processing different tiles).

Figure 3:
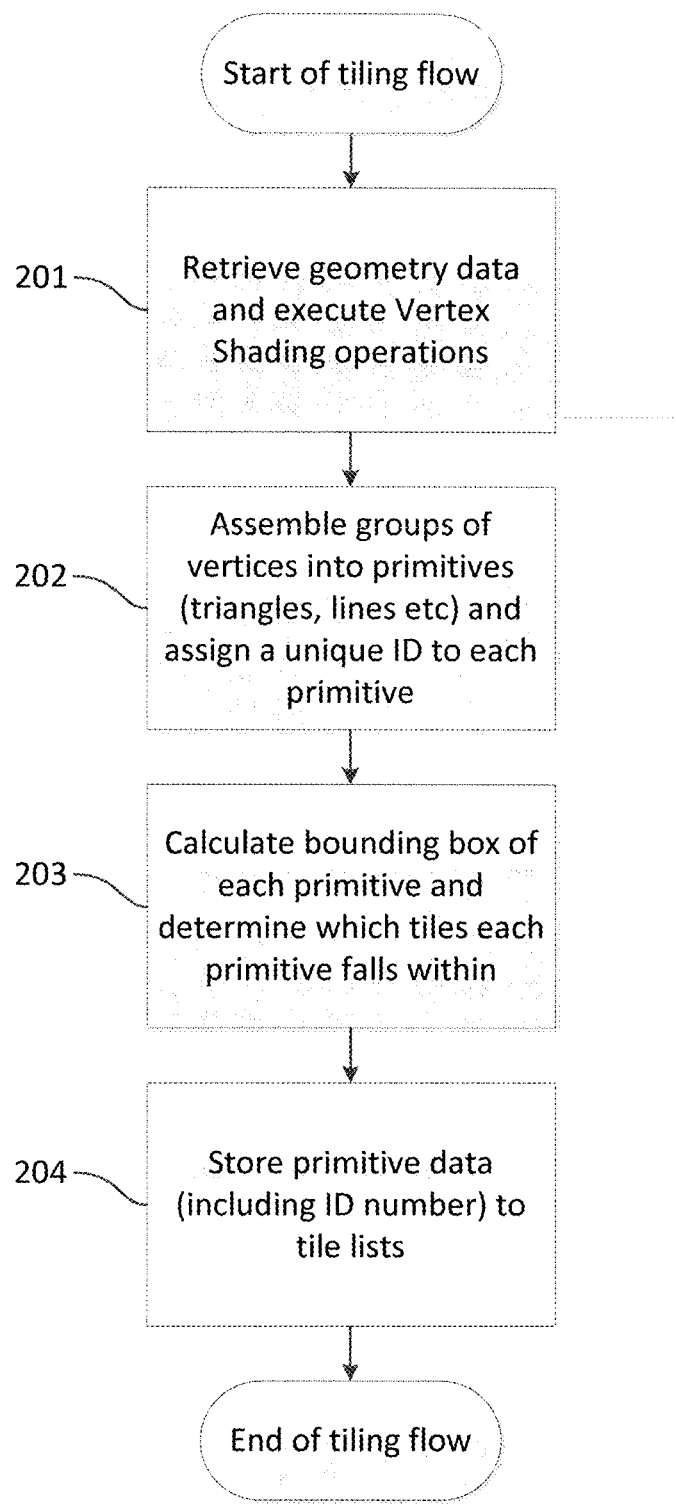
FIG. 3 illustrates a tiling flow process that is used by the graphics processing system.

FIG. 3 shows operation of the graphics processing unit 10, in the present embodiment.

In step 201, the vertex shading stage 21 of the graphics processing unit 10 executes vertex shading operations (which may include, for example, various transformation and processing operations, as is known in the art) on raw geometry data for the graphics processing output (e.g. frame) that is to be processed. This geometry data is retrieved from the main memory 14 and is processed by the vertex shading stage 21 in order to produce transformed geometry data. The transformed geometry data comprises, for example, transformed vertices (vertex data), etc., as is known in the art.

In step 202, the primitive assembly stage 22 of the graphics processing unit 10 assembles geometric primitives using the transformed geometry data. It also assigns a unique ID number to each primitive that is assembled. The primitives that are assembled may be triangles, lines, etc.

The unique ID number may be assigned to each primitive in any suitable and desired manner. In the present embodiment, the geometry data retrieved from the memory in step 201 for each primitive will include an identification number that is used by the application programming interface in order to track primitives earlier in the graphics pipeline. However, as this identification number may not be unique to the primitive to which it is assigned (within the set of primitives being processed) (i.e. it may be that two or more primitives use the same identification number), in the present embodiment, step 202 includes modifying, for each primitive, the identification number (which was assigned earlier in the graphics pipeline) for the primitive to provide a new ID number which is unique to the primitive (within the set of primitives being processed).

It would also be possible to use other techniques for assigning an identifier (such as, e.g., a unique ID number) to each primitive. For example, a unique ID number for each primitive could be created from scratch by the geometry processor 23 (at step 202, for example).

It should also be noted here that, whilst in the present embodiment unique ID numbers are assigned to each primitive at the primitive assembly stage, they could instead be assigned at an earlier (or later) stage of the graphics pipeline, if so desired. However the unique ID numbers must be assigned to a primitive before a graphics processing core begins reading that primitive off a tile list (as will be understood from the discussion below in relation to FIG. 4).

In step 203, the tiling unit 23 determines the location of each primitive in turn and accordingly the tiles of the graphics output (frame) that a given primitive falls within (or may potentially fall within) using a bounding box technique. Thus in the present embodiment, the tiling unit 23 uses the transformed geometry data for a given primitive to construct a bounding box for the primitive and then identifies which tiles the primitive's bounding box falls within (intersects. This process can be carried out in any suitable and desired manner, such as by using techniques known for this purpose in the art. The bounding box is in an embodiment generated by the tiling unit 23, but other arrangements would, of course, be possible.

It would also be possible to use other techniques for determining and locating the primitives within the graphics output in relation to the tiles, if desired.

In step 204, the tiling unit stores, for each primitive in turn, data relating to that primitive in each tile list stored in the main memory 14 corresponding to each tile that the primitive is determined to (potentially) fall within, according to the results of step 203. In the present embodiment, this data will include the primitive's unique ID number. The data may also include e.g. vertex data, commands, etc., for that primitive, as is known in the art.

It should be noted here that, whilst in the present embodiment the vertex shading step (step 201) and primitive assembly step (step 202) of the tiling flow process are implemented by the graphics processing unit 10, other arrangements (both for these steps and otherwise) would, of course, be possible. For example, one or both of these steps could instead be implemented by a dedicated geometry processor that is separate from the graphics processing unit 10. Similarly, whilst in the present embodiment the tiling steps (steps 203 and 204) are implemented by a dedicated and separate tiling unit 23, these steps could, for example, instead be implemented by one or more (e.g. a shared) graphics processing cores.

Figure 4:
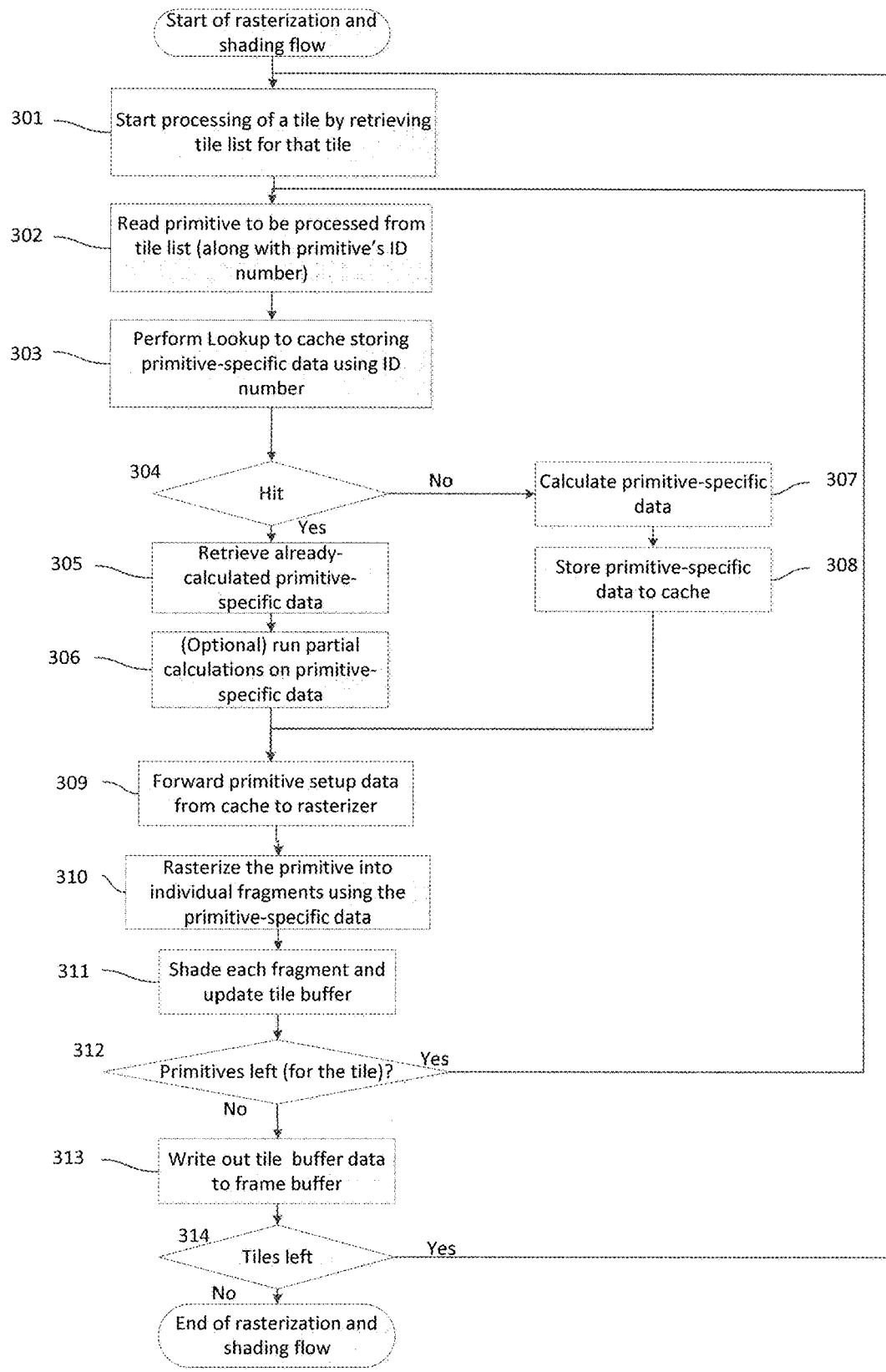
FIG. 4 illustrates a method performed by a graphics processing core when processing a tile (or tiles) of an output array.

FIG. 4 shows the operation of the graphics processing cores 11, 12, 13, in the present embodiment.

The operation of FIG. 4 is carried out by a graphics processing core once that graphics processing core has been allocated a tile to process (rasterise and render).

In step 301, the graphics processing core begins processing a tile by retrieving the tile list corresponding to that tile from the main memory 14.

In step 302, the tile list reader 31 of the graphics processing core identifies a primitive that is to be processed for the tile being processed by reading that primitive off the tile list, along with the unique ID number for that primitive that was assigned to the primitive at an earlier stage, as described above). When reading the primitive off the tile list, the tile list reader 31 may also read data (e.g. vertex data), commands, etc., for the primitive, as is known in the art.

In step 303, the graphics processing core performs a lookup to the primitive data cache 32 in order to determine whether or not already-calculated primitive-specific data for the primitive to be processed is stored in the primitive data cache 32. According to the described embodiment, this lookup is performed by checking whether or not the ID number of the primitive to be processed matches the ID number for any entry stored in the primitive data cache 32. The graphics processing core will therefore systematically read through the list of entries stored in the primitive data cache 32, checking to see if the ID number stored for any entry matches the ID number of the primitive to be processed (i.e. the primitive that was identified in step 302). If a match is found, the graphics processing core will stop reading the list of entries and will proceed to step 305. If, on the other hand, after reading the entire list of entries stored in the primitive data cache 32, no match is found for the ID number of the primitive to be processed, then the graphics processing core will proceed to step 307.

If the ID number for the primitive to be processed (which was read off the tile list in step 302) matches the ID number for an entry stored in the primitive data cache 32, then this constitutes a "hit" and indicates that already-calculated primitive-specific data for that primitive is stored in primitive data cache 32. In this case, the already calculated primitive-specific data for that primitive stored in the matching entry is retrieved from the primitive data cache 32 (step 305).

In (optional) step 306, the graphics processing core runs partial calculations on the already-calculated primitive-specific data which was retrieved from the primitive data cache 32 in step 305. As discussed above, these partial calculations may be performed in order to convert the already-calculated primitive-specific data (retrieved from the primitive data cache 32) into a form that it is (more) appropriate for use when processing the current tile.

If the ID number for the primitive to be processed (which was read off the tile list in step 302) does not match the ID number stored for any entry stored in the primitive data cache 32, then this constitutes a "miss" and indicates that no primitive-specific data for the primitive is stored in primitive data cache 32. In this case, since there is no relevant primitive-specific data to be retrieved from the primitive data cache 32, the primitive setup unit 35 of the graphics processing core will instead calculate primitive-specific data for the primitive from scratch (step 307). For example, and as discussed above, calculating primitive-specific data may include deriving, e.g., line equations for the primitive from, e.g., primitive vertex data.

In step 308, the newly-calculated primitive-specific data is stored in the primitive data cache 32. In present embodiment the primitive-specific data is stored in the primitive data cache 32 in an entry alongside the ID number for the primitive to which the primitive-specific data corresponds. (As will be understood, this will allow the ID number for that particular primitive to (potentially) be matched when step 303 is carried out for, e.g., another tile).

As noted above, in the present embodiment each primitive data cache 32 is only able to store a limited number of primitive-specific data entries. Therefore if, at step 308, the primitive data cache 32 is full (i.e. does not contain room for any more (new) primitive-specific data entries), then the graphics processing core will store the newly-calculated primitive-specific data by overwriting another entry which contains primitive-specific data for another primitive. The entry that is chosen to be overwritten may be decided upon according to a particular overwrite algorithm, or in any other suitable and desired manner.

In step 309, the primitive-specific data that has been acquired for the primitive to be processed is forwarded to the rasteriser 33. (As will be understood from the above, the primitive-specific data may have been acquired either in step 307, or in step 305 (or, optionally, in a combination of steps 305 and 306), depending on whether or not a "hit" was registered in step 304.)

In step 310, the rasteriser 33 will use the primitive-specific data to rasterise the primitive into individual fragments, e.g. according to any such method known in the art. This may include, for example, and as discussed above, using the line equations (of the primitive-specific data) to test which sampling points within the tile are covered by that particular primitive.

In step 311 the shading unit 34 will perform shading operations on the fragments resulting from step 310, and generate shaded fragment data which is then used to update the tile buffer (or tile buffers). As is known the art, these shading operations may also utilise the primitive-specific data for the primitive. For example, step 311 may include shading the primitive using, e.g., the barycentric equations of the primitive-specific data.

Once step 311 is completed, the graphics processing core will have completed processing (rasterising and rendering (shading)) the primitive which was identified in step 301 for the tile that is being processed. Therefore in step 312, the graphics processing core checks (by, for example, having the tile list reader 31 check the tile list for the tile being processed) whether or not there remain any other primitives that are to be processed for the tile being processed. If it is determined that at least one other primitive is to be processed for the tile being processed, then the graphics processing core will return to step 302 and identify another primitive to be processed. This primitive will be the next primitive in the tile list for the tile being processed. The graphics processing core will then operate in accordance with steps 302 through to 311, which includes, inter alia, determining whether or not primitive-specific data is stored for the primitive, retrieving that data (if it is stored) or else calculating primitive-specific data from scratch, using the acquired primitive-specific data to process (rasterise and render (shade)) the primitive, etc.

The graphics processing core will continue processing primitives for the tile being processed until there remain no more primitives to be processed for the tile, at which point it will proceed to step 313. In step 313, the graphics processing core writes the content of the tile buffer to the frame buffer stored in the main memory 14. Completion of this step signifies that the graphics processing core has completed processing the tile.

The graphics processing core will then check (in step 314) whether or not it has been allocated another tile to process. If it has, the graphics processing core will return to step 301 and begin processing the new tile, including retrieving the tile list corresponding to the new tile that is to be processed, identifying a primitive off the tile list, determining whether or not primitive-specific data is stored for the primitive, retrieving that data (if it is stored) or else calculating primitive-specific data from scratch, using the acquired primitive-specific data to process (rasterise and render (shade)) the primitive, etc., according to steps 301 through to 311. The graphics processing core will process each primitive for the new tile in turn, until that tile has completed being processed. This process will then be repeated for every tile allocated to the graphics processing core, until there are no more tiles of the graphics output (e.g. frame) left for the graphics processing core to process.

As discussed above, the principle idea of the technology described herein is to store primitive-specific data for a given primitive when it is calculated whilst processing a first tile, so that it may (potentially) be reused when the same primitive is to be processed again, for example when processing a second tile (or indeed a third tile, or fourth tile, etc.). Retrieving stored primitive-specific data when a given primitive is to be processed in the second tile (or third tile, or fourth tile, etc.), rather than calculating primitive-specific data from scratch again, leads to an energy saving overall, since it reduces the need for the graphics processing core to have to repeat the primitive-specific data calculations each time the primitive is to be processed.

In the present embodiment, as will be understood from the above, once a first tile has been processed by the graphics processing core according to the method shown in FIG. 4, the primitive data cache 32 of that graphics processing core will contain entries for some (if not all) of the primitives that were processed for that tile. Each of these entries will contain primitive-specific data for a particular primitive (which was processed when processing the first tile), along with a unique ID number for that primitive. When the graphics processing core begins processing another tile, the graphics processing core checks the ID number of a primitive to be processed for this (second) tile against those ID numbers stored in the primitive data cache 32 (in step 303). If that same primitive was also processed when the first tile was processed, then primitive-specific data for that primitive will already be stored in the primitive data cache 32, alongside that primitive's ID number (assuming that it hasn't been overwritten). Hence the graphics processing core will register a "hit" (in step 304) and will retrieve the primitive-specific data so that it may be reused when processing the current tile.

The technology described herein requires a mechanism to be implemented by a graphics processing core for storing primitive-specific data, and for determining whether or not primitive-specific data is stored for a primitive so that it may be retrieved. It should be noted that the preceding description provides just one such possible mechanism, wherein each primitive is assigned a unique ID number which is then checked against the ID number of entries stored in a primitive data cache of the graphics processing core, to determine whether or not the cache contains primitive-specific data for the primitive to be processed. However other suitable mechanisms are of course possible.

The preceding description assumes that each graphics processing core 11, 12, 13, has its own primitive data cache 32. Each graphics processing core stores primitive-specific data to and performs the lookup of primitive ID numbers on its own primitive data cache 32. As will be understood from the above, in this arrangement, wherein individual graphics cores have their own respective primitive data cache 32, it would only possible be possible to register a "hit" in step 304 if the primitive for which a lookup is being performed by a particular graphics core had already been processed by the same graphics processing core (which would, as will be understood from the above, have resulted in primitive-specific data for the primitive being stored in the cache).

However further embodiments are contemplated wherein a single primitive data cache is shared between a plurality of graphics processing cores. In such embodiments, it would be possible for any of those graphics processing cores sharing the single data cache to store primitive-specific data to and perform lookup of a primitive in the cache. Therefore in these embodiments it would be possible, for example, for a first graphics processing core to store primitive-specific data for a particular primitive, and for that primitive-specific data to retrieved (and reused) by a second graphics processing core when the same primitive is to be processed by the second graphics processing core. If each graphics processing core stores primitive-specific data to the shared cache, then this may, in effect, increase the total "pool" of primitive-specific data entries from which primitive-specific data may be retrieved. Therefore by being able to (potentially) retrieve and reuse primitive-specific data calculated by a number of graphics processing cores (rather than just a single graphics processing core, as in the embodiment described in detail above), these embodiments may provide the additional benefit of (potentially) allowing more successful lookups and retrievals.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

What is claimed is:

1. A method comprising:
    identifying a primitive to be processed for a tile of a graphics output being processed and then determining whether one or more already-calculated primitive-specific equations representing the geometry of the identified primitive that were calculated when processing another tile of the graphics output are stored in a memory; and
    in response to a determination that one or more already-calculated primitive-specific equations representing the geometry of the identified primitive that were calculated when processing another tile of the graphics output are stored in the memory, retrieving one or more of those already-calculated primitive-specific equations representing the geometry of the identified primitive and using those one or more retrieved primitive-specific equations to process the identified primitive;
    in response to a determination that one or more already-calculated primitive-specific equations representing the geometry of the identified primitive are not stored in the memory, calculating one or more primitive-specific equations representing the geometry of the identified primitive, using those one or more calculated primitive-specific equations to process the identified primitive, and storing, for use after the identified primitive has been processed, at least some of the one or more calculated primitive-specific equations.

2. The method of claim 1 wherein the memory is a memory that is accessible by at least two graphics processing cores of a multi-core graphics processing system.

3. The method of claim 1, further comprising, in response to the determination that the one or more already-calculated primitive-specific equations representing the geometry of the identified primitive are stored in the memory, calculating primitive-specific data additional to the one or more retrieved primitive-specific equations representing the geometry of the identified primitive, and also using that additional primitive-specific data to process the identified primitive.

4. The method of claim 1, wherein:
determining whether the one or more already-calculated primitive-specific equations representing the geometry of the identified primitive are stored in a memory comprises checking whether or not a particular identifier for the identified primitive is the same as an identifier stored in the memory in association with the one or more already-calculated primitive-specific equations for the primitive to which the identifier relates; and
wherein storing at least some of the one or more calculated primitive-specific equations comprises storing the at least some of the one or more calculated primitive-specific equations in association with a particular identifier for the primitive to which the primitive-specific equations correspond.

5. The method of claim 4, wherein the identifier stored in the memory is a modified version of an identifier that is already specified for use for identifying primitives.

6. The method of claim 4, wherein identifying a primitive to be processed for a tile being processed comprises reading the identifier for the primitive to be processed from a tile list for the tile being processed.

7. The method of claim 1, wherein using the one or more retrieved primitive-specific equations to process the identified primitive comprises modifying at least some of the one or more retrieved primitive-specific equations, and using those one or more modified primitive-specific equations to process the identified primitive.

8. The method of claim 1, wherein processing the identified primitive comprises at least one of: rasterising and rendering the identified primitive.

9. A tile-based graphics processing system comprising a graphics processing core for processing a tile of a graphics output to be generated, wherein the graphics processing core is capable of:
identifying a primitive to be processed for the tile of the graphics output being processed and then determining whether one or more already-calculated primitive-specific equations representing the geometry of the identified primitive that were calculated when processing another tile of the graphics output are stored in a memory; and
in response to a determination that one or more already-calculated primitive-specific equations representing the geometry of the identified primitive that were calculated when processing another tile of the graphics output are stored in the memory, retrieving one or more of those already-calculated primitive-specific equations representing the geometry of the identified primitive and using those one or more retrieved primitive-specific equations to process the identified primitive;
in response to a determination that one or more already-calculated primitive-specific equations representing the geometry of the identified primitive are not stored in the memory, calculating one or more primitive-specific equations representing the geometry of the identified primitive, using those one or more calculated primitive-specific equations to process the identified primitive, and storing, for use after the identified primitive has been processed, at least some of the one or more calculated primitive-specific equations.

10. The system of claim 9, wherein the tile-based graphics processing system is a multi-core tile-based graphics processing system.

11. The system of claim 10, wherein the memory is a memory that is accessible by at least two graphics processing cores of the multi-core tile-based graphics processing system.

12. The system of claim 9, wherein the graphics processing core is capable of, in response to the determination that the one or more already-calculated primitive-specific equations representing the geometry of the identified primitive are stored in the memory, calculating primitive-specific data additional to the one or more retrieved primitive-specific equations representing the geometry of the identified primitive, and also using that additional primitive-specific data to process the identified primitive.

13. The system of claim 9, wherein:
determining whether the one or more already-calculated primitive-specific equations representing the geometry of the identified primitive are stored in a memory comprises checking whether or not a particular identifier for the identified primitive is the same as an identifier stored in the memory in association with the one or more already-calculated primitive-specific equations for the primitive to which the identifier relates; and
wherein storing at least some of the one or more calculated primitive-specific equations comprises storing the at least some of the one or more calculated primitive-specific equations in association with a particular identifier for the primitive to which the primitive-specific equations correspond.

14. The system of claim 13, wherein the identifier stored in the memory is a modified version of an identifier that is already specified for use for identifying primitives in the graphics processing system.

15. The system of claim 13, wherein identifying a primitive to be processed for a tile being processed comprises reading the identifier for the primitive to be processed from a tile list for the tile being processed.

16. The system of claim 9, wherein using the one or more retrieved primitive-specific equations to process the identified primitive comprises modifying at least some of the one or more retrieved primitive-specific equations, and using those one or more modified primitive-specific equations to process the identified primitive.

17. The system of claim 9, wherein processing the identified primitive comprises at least one of: rasterising and rendering the identified primitive.

18. A non-transitory computer readable storage medium storing computer software code which when executing on at least one processor performs a method that comprises:
identifying a primitive to be processed for a tile of a graphics output being processed and then determining whether one or more already-calculated primitive-specific equations representing the geometry of the identified primitive that were calculated when processing another tile of the graphics output are stored in a memory; and in response to a determination that one or more already-calculated primitive-specific equations representing the geometry of the identified primitive that were calculated when processing another tile of the graphics output are stored in the memory, retrieving one or more of those already-calculated primitive-specific equations representing the geometry of the identified primitive and using those one or more retrieved primitive-specific equations to process the identified primitive;

in response to a determination that one or more already-calculated primitive-specific equations representing the geometry of the identified primitive are not stored in the memory, calculating one or more primitive-specific equations representing the geometry of the identified primitive, using those one or more calculated primitive-specific equations to process the identified primitive, and storing, for use after the identified primitive has been processed, at least some of the one or more calculated primitive-specific equations.

* * * * *